United States Patent Office 3,573,284
Patented Mar. 30, 1971

3,573,284
NOVEL Δ⁴,⁹,¹¹-GONATRIENES
Georges Muller, Nogent-sur-Marne, and Andre Pierdet, Noisy-le-Sec, France, assignors to Roussel-UCLAF, Paris, France
No Drawing. Filed Sept. 4, 1968, Ser. No. 757,508
Claims priority, application France, Sept. 8, 1967, 120,419
The portion of the term of the patent subsequent to June 20, 1983, has been disclaimed
Int. Cl. C07c 173/00
U.S. Cl. 260—239.55                      14 Claims

ABSTRACT OF THE DISCLOSURE

Δ⁴,⁹,¹¹-gontriene-3-ones of the formula

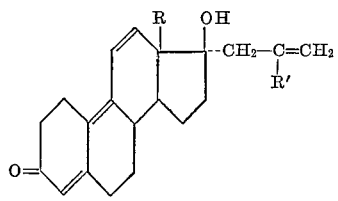

(I)

wherein R is alkyl of 1 to 4 carbon atoms and R' is selected from the group consisting of hydrogen and methyl with the proviso that R is other than methyl when R' is hydrogen which have a strong progestomimetic activity and process for their preparation and intermediates formed therein.

PRIOR ART

Commonly assigned U.S. Pat. No. 3,257,278 discloses Δ⁴,⁹,¹¹-gonatrienes of the formula

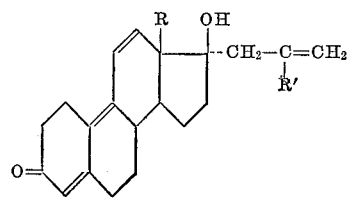

(II)

wherein R″ is lower alkyl and R‴ is lower hydrocarbon, which compounds possess endocrinic properties. The compounds of the present invention possess a much greater progestomimetic activity than known 13β,17α-dialkyl-Δ⁴,⁹,¹¹-gonatrienes.

OBJECTS OF THE INVENTION

It is an object of the invention to provide the novel Δ⁴,⁹,¹¹-gonatriene-3-ones of Formula I.

It is a further object of the invention to provide a novel process for the preparation formed therein.

It is another object of the invention to provide novel progestomimetic compositions.

It is an additional object of the invention to provide a novel method inducing progestomimetic activity in warm-blooded animals.

These and other objects and advantages of the invention will become obvious from the following detailed description.

THE INVENTION

The novel Δ⁴,⁹,¹¹-gonatriene-3-ones of the invention have the formula

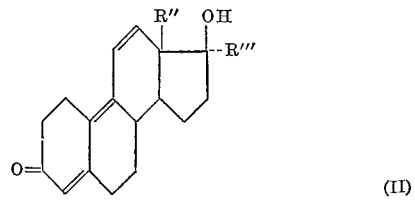

(I)

wherein R is alkyl of 1 to 4 carbon atoms and R' is selected from the group consisting of hydrogen and methyl with the proviso that R is other than methyl when R' is hydrogen. Of particular interest are 17α-(2'-methyl)-allyl - Δ⁴,⁹,¹¹ - estratriene-17β-ol-3-one, 13β-ethyl-17α-(2'-methyl) - allyl - Δ⁴,⁹,¹¹ - gonatriene - 17β-ol-3-one, 13β-n-propyl - 17α - (2'-methyl)-allyl-Δ⁴,⁹,¹¹-gonatriene-17β-ol-3-one and 13β-ethyl-17α-allyl-Δ⁴,⁹,¹¹-gonatriene-17β-ol-3-one.

The gonatrienes of Formula I possess a very strong hormonal activity and their progestomimetic activity on warm-blooded animals is practically equal, if not superior to that of 6-chloro-6-dehydro-17α-acetoxyprogesterone by oral route.

The great therapeutic interest presented by compounds of similar activity to that of progesterone is known at the present time. They are particularly useful either as progestatives compensating lutien-secretion deficiencies in woman and bringing about a considerable improvement in the various disturbances of the endocrine function in young women or of the psychism in women at the time of menopause or as, an anti-androgenic agent by blocking the hypophysiary gonadotrophic secretion (LH) and by fighting disturbances related to testicular hyperfunctioning.

In addition, they find a particularly important use as contraceptives without endocrinal or hypophysiary effects. Administered at very small doses (0.1 mg. to 0.5 mg.) each day, they bring about important alterations of the pH and of the consistency of the cervical glair as well as of the trophism of the endometrium. For this reason, it is possible to administer them without the addition of any estrogenic substance and without repercussion on the hormone equilibrium. These properties only belong to powerful progestomimetics.

The novel process of the invention for the preparation of the Δ⁴,⁹,¹¹-gonatriene-3-ones of Formula I comprises the reaction of a compound of the formula

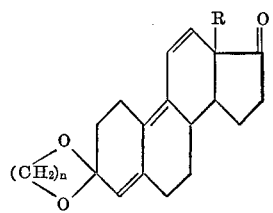

wherein R has the above definition and n is an integer from 2 to 4 with a methallyl or allyl metallic derivative wherein the metal is selected from the group consisting of zinc, aluminum and magnesium to form a compound of the formula

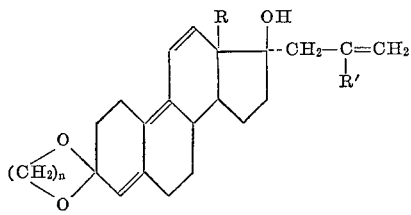

wherein R, R' and n have the above definitions and subjecting the latter to acid hydrolysis to form the corresponding Δ$^{4,9,11}$-gonatriene-3-one of Formula I.

Preferably the methallyl or allyl metallic derivative is a magnesium halide such as the bromide, chloride or iodide and the alkylenedioxy derivative is preferably 3-ethylenedioxy. The acid hydrolysis can be effected with an aqueous mineral acid such as aqueous hydrochloric acid or an aqueous organic acid such as aqueous citric acid or acetic acid.

The progestomimetic compositions are comprised of at least one compound of the formula

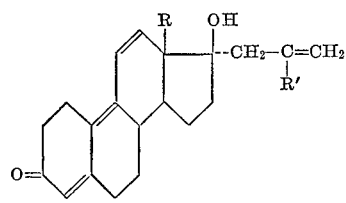

wherein R is alkyl of 1 to 4 carbon atoms and R' is selected from the group consisting of hydrogen and methyl with the proviso that R is other than methyl when R' is hydrogen and a major amount of a pharmaceutical carrier. The compositions may be in the form of injectable solutions or suspensions put up in ampules or multi-dose flacons, in tablets, coated tablets, capsules and suppositories prepared in the usual manner. The individual dosage is between 0.1 and 40 mg. in the adult.

They can be used for the treatment of amenorrheas, hypermenorrheas, metrorrhagias, menorrhagias, sterility, abortion, all manifestations of hyperfolliculinia, nervous and psychic symptoms which are related thereto and manifestations of hypogalactia and, in a more general way, all disturbances related to a lutein deficiency.

The method of the invention of inducing progestomimetic activity in warm-blooded animals comprises administering to warm-blooded animals an effective amount of at least one Δ$^{4, 9, 11}$-gonatriene-3-one of the Formula I. The compounds may be administered orally, transcutaneously or rectally. The usual daily dosage is 0.002 to 0.6 mg./kg. depending upon the method of administration.

In the following examples there are described several preferred embodiments to illustrate the invention. However, it should be understood that the invention is not intended to be limited to the specific embodiments.

EXAMPLE I

Preparation of 17α-(2'-methyl)-allyl-Δ$^{4,9,11}$-estratriene-17β-ol-3-one

Step A: 3 - ethylenedioxy-17α(2'-methyl)-allyl-Δ$^{4,9,11}$-estratriene-17β-ol.—A solution of 2 cc. of β-methallyl chloride in 2 cc. of ether was added at room temperature to 0.60 g. of magnesium under 5 cc. of ether and the mixture was then heated at reflux for 30 minutes to obtain a suspension of methallyl magnesium chloride. 0.99 gm. of 3-ethylenedioxy-Δ$^{4,9,11}$-estratriene-17-one (by process of Dutch patent application No. 6607609 published on Dec. 2, 1966) in 20 cc. of tetrahydrofuran was added to the said suspension and the mixture was heated for 4 hours at 40–45° C. After cooling the mixture, a solution of 3 gm. of ammonium chloride in 10 cc. of water was added thereto. The resulting solution was extracted with ether and the ether phase was washed with water, dried over sodium sulfate, treated with charcoal and distilled to dryness to obtain 1.22 gm. of 3-ethylenedioxy-17α-(2'-methyl)-allyl-Δ$^{4,9,11}$-estratriene-17β-ol which was used as such for the next step. As far as is known, this compound is not described in the literature.

Step B: 17α-(2'-methyl)-allyl-Δ$^{4,9,11}$-estratriene-17β-ol-3-one.—1.2 gm. of the 3-ethylenedioxy product of Step A were dissolved in 50 cc. of acetic acid containing 25% water and after stirring the solution for one hour at room temperature, ice was added thereto and it was made alkaline by the addition of 35 cc. of ammonia. The solution was extracted with ether and the ether extracts were washed with a sodium bicarbonate solution, then with a sodium chloride solution, dried and distilled to dryness. The residue was chromatographed on silica to obtain 400 mg. of a crude product which was dissolved in an ether-methylene chloride mixture. The resulting solution was treated with charcoal, filtered and distilled to dryness in vacuo. The residue was dissolved in 1.5 cc. of ether and after adding 6 cc. of isopropyl ether thereto, the solution was ice-cooled and suction filtered. The precipitate was washed with isopropyl ether and then dried at 60° C. to obtain 0.22 gm. of 17α-(2'-methyl)allyl-Δ$^{4,9,11}$-estratriene-17β-ol-3-one having a melting point of 50–60° C. Another 104 mg. of the said product were recovered by chromatography of the mother liquors for a total yield of 30%.

The product occurred in the form of a pale yellow solid which was soluble in ether and methylene chloride and insoluble in water.

Analysis.—Calculated for $C_{22}H_{28}O_2$ (molecular weight=324.44). C, 81.44%; H, 8.70%. Found: C, 81.1%; H, 9.0%.

I.R. spectrum (chloroform):
 Presence of trienone
 Presence of OH at 3595 cm.$^{-1}$ and 3530 cm.$^{-1}$
 Presence of $CH_2$=C< at 896 cm.$^{-1}$
U.V. spectrum (ethanol):

$$\lambda_{max.} \text{ at } 238 \text{ m}\mu \ E^{1\%}_{1 \text{ cm.}}=179$$

$$\lambda_{max.} \text{ at } 269 \text{ m}\mu \ E^{1\%}_{1 \text{ cm.}}=112$$

$$\lambda_{max.} \text{ at } 344 \text{ m}\mu \ E^{1\%}_{1 \text{ cm.}}=855$$

As far as is known, this compound is not described in the literature.

EXAMPLE II

Preparation of 13β ethyl - 17α - (2-methyl)allyl-Δ$^{4,9,11}$-gonatriene-17β-ol-3-one Step A: 3 - ethylenedioxy-13β-ethyl-17α-(2'-methyl) allyl-Δ$^{4,9,11}$-gonatriene-17β-ol.—5.4 gm. of magnesium were introduced into 150 cc. of tetrahydrofuran to which first 22 cc. of β-methallyl chloride and then 50 cc. of tetrahydrofuran were added at 30–35° C. The mixture was then stirred at 30–35° C. for 1½ hours to obtain a solution titrating 0.66 mole of methallyl magnesium chlorodie per liter. A solution of 0.652 gm. of 3-ethylenedioxy-13β-ethyl-Δ$^{4,9,11}$-gonatriene-17-one (produced by process of French Pat. No. 1,514,088) in 6.5 cc. of tetrahydrofuran was added at room temperature to 26 cc. of the methallyl magnesium chloride solution and the mixture was stirred for 30 minutes and then heated at 40° C. for 3 hours. After cooling the reaction mixture to 15° C., a solution of 10 gm. of ammonium chloride in 30 cc. of water was added thereto. The aqueous phase was separated and the organic phase was washed with a sodium chloride solution. The mother liquor and the wash waters were extracted with ether and the combined organic phases were dried over sodium sulfate and distilled to dryness to obtain 1.10 gm. of crude product. This product was chromatographed on silica and eluted with a 1:1 ether-petroleum ether mixture to obtain 0.474 gm. of 3-ethylenedioxy - 13β - ethyl-17α-(2'-methyl)allyl-Δ$^{4,9,11}$-gonatriene-17β-ol having a melting point of 125–126° C. The solid product was soluble in methanol, ether and chloroform and insoluble in water.

As far as is known, this compound is not described in the literature.

Step B: 17β-ethyl-17α-(2'-methyl)allyl - $\Delta^{4,9,11}$-gonatriene-17β-3-one.—0.47 gm. of the product of Step A, 11.5 cc. of methanol, 1.8 cc. of water and 0.225 gm. of citric acid were admixed and stirred for 40 minutes at room temperature. After addition of water, the mixture was extracted with methylene chloride and the organic phase was washed with water until the wash waters were neutral, dried and distilled to dryness. The residue was recrystallized from hot and cold isopropyl ether to obtain 0.275 gm. of a product having a melting point of 158–159° C. The product was recrystallized from 1:4 ether-isopropyl ether mixture to obtain 0.251 g. (91% yield of crystallization) 13β-ethyl-17α-(2'-methyl)-allyl-$\Delta^{4,9,11}$-gonatriene 17β-ol 3-one having a melting point of 159° C. and a specific rotation $[\alpha]_D^{20} = -82.5° \pm 2.5°$ (c.=0.65% in ethanol). The pale yellow solid product was soluble in ethyl alcohol, chloroform and ether, slightly soluble in isopropyl ether and insoluble in water.

Analysis. — Calculated for $C_{23}H_{30}O_2$ (molecular weight=338.47). C, 81.6%; H, 8.93%. Found: C, 81.7%; H, 9.1%.

I.R. spectrum (chloroform):
Absence of 17-ketone
Presence of OH at 3590 cm.$^{-1}$ and 3536 cm.$^{-1}$
Presence of C=C< at about 896 cm.$^{-1}$
Presence of trienone U.V. spectrum (ethanol):

$\lambda_{max.}$ at 238 mμ $E_{1\,cm.}^{1\%} = 163$ $\lambda_{max.}$ at 269 mμ $E_{1\,cm.}^{1\%} = 107$ inflex. at about 283–284 mμ $E_{1\,cm.}^{1\%} = 124$ $\lambda_{max.}$ at 344 mμ $E_{1\,cm.}^{1\%} = 883$ As far as is known, this compound is not described in the literature.

EXAMPLE III

Preparation of 13β-ethyl-17α-allyl-$\Delta^{4,9,11}$-gonatriene-17β-ol-3-one

Step A: 3-ethylenedioxy-13β-ethyl-17α-allyl-$\Delta^{4,9,11}$-gonatriene-17β-ol.—5 gm. of magnesium were suspended with stirring at +10° C. in 20 cc. of ether and a solution of 10 gm. of allyl bromide in 80 cc. of ether was added thereto. After stirring for 2 hours at room temperature, the excess magnesium was removed to obtain a solution titrating 0.91 mole of allyl magnesium bromide per liter. 1.80 gm. of 3-ethylenedioxy-13β-ethyl-$\Delta^{4,9,11}$-gonatriene-17-one dissolved in 45 cc. of tetrahydrofuran was added under stirring and nitrogen atmosphere to 70 cc. of the said magnesium solution and the mixture was stirred at 0° C. for one hour. 100 cc. of a saturated aqueous solution of ammonium chloride was added to the reaction mixture and the mixture was extracted with ether. The organic phase was washed with water until the wash waters were neutral and then distilled to dryness in vacuo to obtain 1.98 m. of 3-ethylenedioxy-13β-ethyl-17α-allyl-$\Delta^{4,9,11}$-gonatriene-17β-ol which was used as such for the next step.

I.R. spectrum (chloroform):
Presence of OH at 3595 cm.$^{-1}$ and 3570 cm.$^{-1}$
Presence of $CH_2=CH$ at 1639 cm.$^{-1}$ As far as is known, this compound is not described in the literature.

Step B: 13β - ethyl - 17α - allyl - $\Delta^{4,9,11}$-gonatriene-17β-ol-3-one.—1.98 gm. of the product of Step A were dissolved in 45 cc. of methanol and 6.3 cc. of water and 0.90 gm. of citric acid were added to the resulting solution with stirring at room temperature and under nitrogen atmosphere. After stirring for 40 minutes, 100 cc. of water were added to the reaction mixture. The precipitate was extracted with ether and the ether phase was washed with water until neutrality of the wash waters and distilled to dryness in vacuo to obtain 1.79 gm. of crude product. The said product was chromatographed on silica with elution with a 7:3 benzene-ethyl acetate mixture to obtain 1.52 gm. of product which was recrystallized from hot and cold isopropyl ether to obtain 1.24 gm. of 13β-ethyl-17α-allyl-$\Delta^{4,9,11}$-gonatriene-17β-ol - 3 - one having a melting point of 115° C. and a specific rotation $$[\alpha]_D^{20} = -59.5° \pm 2°$$

(c.=0.65% in ethanol).

The product occurred in the form of a solid yellow product soluble in alcohol, chloroform and ethyl acetate, slightly soluble in isopropyl ether and insoluble in water.

Analysis.—Calculated for: $C_{22}H_{28}O_2$ (molecular weight=324.44). C, 81.43%; H, 8.70%. Found: C, 81.6%; H, 8.9%.

I.R. spectrum (chloroform):
Presence of complex OH at 3595 cm.$^{-1}$ and 3570 cm.$^{-1}$
Presence of $CH_2=CH$ at 923 cm.$^{-1}$ and 999 cm.$^{-1}$
Presence of complex trienone
—C=O at 1662 cm.$^{-1}$ and 1645 cm.$^{-1}$
C=C at 1575 cm.$^{-1}$ U.V. spectrum (ethanol):

$\lambda_{max.}$ at 239 mμ $E_{1\,cm.}^{1\%} = 175$ $\lambda_{max.}$ at 269–270 mμ $E_{1\,cm.}^{1\%} = 112$ infl. at about 284 mμ $E_{1\,cm.}^{1\%} = 132$ $\lambda_{max.}$ at 343 mμ $E_{1\,cm.}^{1\%} = 929$ As far as is known, this compound is not described in the literature.

EXAMPLE IV

Preparation of 1,3β-propyl-17α-(2'-methyl)-allyl-$\Delta^{4,9,11}$-gonatriene-17β-ol-3-one Step A: 3-ethylenedioxy-13β-propyl-$\Delta^{4,9,11}$-gonatriene-17-one.—3 gm. of 13β-propyl-$\Delta^{4,9,11}$-gonatriene-3,17-dione (described in Belgian Pat. No. 708,997) were dissolved in 180 cc. of chloroform and 22.5 cc. of ethylene glycol and 0.39 gm. of orthophosphoric acid (99%) were added thereto. The reaction mixture was heated at reflux for 45 hours while draining off condensed chloroform by recycling over silica gel. The reaction mixture was cooled and the excess ethylene glycol was decanted off. The organic phase was washed with a saturated aqueous solution of sodium bicarbonate and the combined aqueous wash waters were extracted with chloroform. The chloroform extracts were added to the main organic solution and the resulting solution was dried and distilled to dryness under reduced pressure in the presence of a trace of pyridine. The residue was pasted in hot ethyl ether containing 0.1% pyridine to obtain 2.58 gm. of crude product melting at 160° C. After crystallization from methanol containing 0.1% pyridine, 2.06 gm. of 3-ethylenedioxy-13β-propyl-$\Delta^{4,9,11}$-gonatriene-17-one having a melting point of 162–163° C. were obtained.

Analysis.—Calculated for: $C_{22}H_{28}O_3$ (molecular weight = 340.44). C, 77.61%; H, 8.29%. Found: C, 77.4%; H, 8.3%.

U.V. spectrum (ethanol):
$\lambda_{max.}$ at 290 mμ (ε=38,300); $\lambda_{max.}$ at 301–302 mμ (ε=30,600).

As far as is known, this compound is not described in the literature.

Step B: 13β-propyl-17α-(2'-methyl)allyl-$\Delta^{4,9,11}$-gonatriene-17β-ol-3-one.—Using the procedure of Example I, methallyl magnesium chloride and 3-ethylenedioxy-13β-propyl-$\Delta^{4,9,11}$-gonatriene-17-one were reacted to form 3-ethylenedioxy-13β - propyl - 17α-(2'-methyl)allyl-$\Delta^{4,9,11}$-gonatriene-17β-ol which, as far as is known, is not described in the literature. The said product was subjected to acid hydrolysis to obtain 13β-propyl-17α-(2′-methyl)-allyl-Δ⁴,⁹,¹¹-gonatriene-17β-ol-3-one having a melting point of 165°C., and a specific rotation $$[\alpha]_D^{20} = -63.5° \pm 2.5°$$

(c.=0.5% in ethanol).

The said product occurred in the form of a pale yellow solid product, soluble in alcohol, ether, acetone, benzene and chloroform and insoluble in water.

*Analysis.*—Calculated for: $C_{24}H_{32}O_2$ (molecular weight = 352.50). C, 81.76%; H, 9.15%. Found: C, 81.5%; H, 9.2%.

I.R. spectrum (chloroform):
Presence of OH at 3590 cm.⁻¹ and 3540 cm.⁻¹
Presence of $CH_2=C<$ at 895 cm.⁻¹

U.V. spectrum (ethanol)

$\lambda_{max.}$ at 239 m$\mu$ $E_{1\ cm.}^{1\%} = 157$ $\lambda_{max.}$ at 270 m$\mu$ $E_{1\ cm.}^{1\%} = 104$ Inflexion at 286 m$\mu$ $E_{1\ cm.}^{1\%} = 112$ $\lambda_{max.}$ at 344–345 m$\mu$ $E_{1\ cm.}^{1\%} = 854$ As far as is known, this compound is not described in the literature.

PHARMACOLOGICAL DATA

(A) Progestomimetic activity

The progestomimetic activity of the compounds of the invention was determined by the Clauberg test using immature, female rabbits previously sensitized by subcutaneous administration of 10 $\mu$gm. of estradiol benzoate for 5 days. Then, the rabbits received the test compounds daily for 5 days and on the sixth day the animals were killed. The proliferation of endometrio lace on the uterus was determined in MacPhail units for the progestomimetic activity. The compounds were administered at the daily dosage in Tables I and II either orally or subcutaneously as a solution in olive oil containing 5% benzyl alcohol. The results were as follows using 6-chloro-6-dehydro-17α-acetoxy progesterone acetate as the standard:

TABLE I.—ORAL ADMINISTRATION

| Compound | Daily dosage | MacPhail units |
|---|---|---|
| 17α-(2′methyl)allyl-Δ⁴,⁹,¹¹-estratriene-17β-ol-3-one | 6.25γ | 2.4 |
| 13β-ethyl-17α-(2′methyl)-allyl-Δ⁴,⁹,¹¹-gonatriene-17β-ol-3-one | 12.50γ | 1.6 |
|  | 25γ | 2.4 |
|  | 6.25γ | 1.4 |
|  | 12.50γ | 2.5 |
|  | 25γ | 2.6 |
| 13β-ethyl-17α-allyl-Δ⁴,⁹,¹¹-gonatriene-17β-ol-3-one | 8γ | 1.5 |
|  | 16γ | 2.3 |
|  | 32γ | 2.5 |
| 6-chloro-6-dehydro-17α-acetoxy progesterone acetate | 5γ | 1.6 |
|  | 10γ | 2.0 |
|  | 20γ | 2.0 |

TABLE II.—SUBCUTANEOUS ADMINISTRATION

| Compound | Daily dosage | MacPhail units |
|---|---|---|
| 17α-(2′methyl)-allyl-Δ⁴,⁹,¹¹-estratriene-17β-ol-3-one | 6.25γ | 2.2 |
|  | 12.50γ | 2.8 |
|  | 25γ | 3.0 |

Table I shows that the compounds of the invention possess a progestomimetic activity at least equal to, if not superior to, that of 6-chloro-6-dehydro-17α-acetoxy progesterone acetate when administered orally. Table II shows that 17α-(2′-methyl)-allyl-Δ⁴,⁹,¹¹-estratriene-17β-ol-3-one has a strong progestomimetic activity at a daily dosage of 6.25λ when administered subcutaneously.

Various modifications of the compositions and methods of the invention may be made without departing from the spirit or scope of the invention.

We claim:
1. A Δ⁴,⁹,¹¹-gonatriene-3-one of the formula

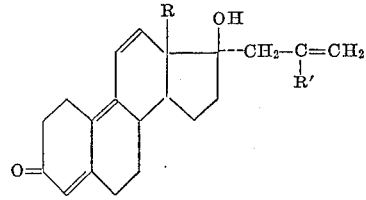

wherein R is alkyl of 1 to 4 carbon atoms and R′ is selected from the group consisting of hydrogen and methyl with the proviso that R is other than methyl when R′ is hydrogen.

2. A compound of claim 1 which is 17α-(2′-methyl)-allyl-Δ⁴,⁹,¹¹-estratriene-17β-ol-3-one.

3. A compound of claim 1 which is 13β-ethyl-17α-(2′-methyl)-allyl-Δ⁴,⁹,¹¹-gonatriene-17β-ol-3-one.

4. A compound of claim 1 which is 13β-propyl-17α-(2′-methyl)-allyl-Δ⁴,⁹,¹¹-gonatriene-17β-ol-3-one.

5. A compound of claim 1 which is 13β-ethyl-17α-allyl-Δ⁴,⁹,¹¹-gonatriene-17β-ol-3-one.

6. A process for the preparation of a compound of claim 1 comprising reacting a methallyl or allyl metallic derivative in which the metal is selected from the group consisting of zinc, aluminum and magnesium with a compound of the formula

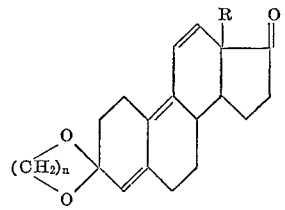

wherein R has the definition of claim 1 and $n$ is an integer from 2 to 4 to form a compound of the formula

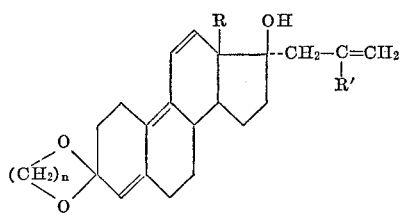

wherein R, R′ and $n$ have the foregoing definitions and subjecting the latter to acid hydrolysis to form the corresponding Δ⁴,⁹,¹¹-gonatriene-3-one.

7. The process of claim 6 wherein the metallic derivative is a magnesium halide selected from the group consisting of chloride, bromide, iodide.

8. The process of claim 6 wherein $n$ is 2.

9. The process of claim 6 wherein the acid hydrolysis is effected with an aqueous acid.

10. A compound of the formula

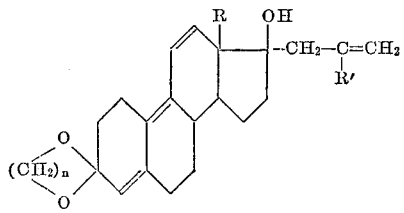

wherein R is alkyl of 1 to 4 carbon atoms and R' is selected from the group consisting of hydrogen and methyl with the proviso that when R' is hydrogen, R is other than methyl and n is an integer from 2 to 4.

11. A compound of claim 10 which is 3-ethylenedioxy-17α-(2'-methyl)-allyl-Δ$^{4,9,11}$-estratriene-17β-ol.

12. A compound of claim 10 which is 3-ethylenedioxy-13β - ethyl - 17α - (2' - methyl) - allyl - Δ$^{4,9,11}$ - gonatriene-17β-ol.

13. A compound of claim 10 which is 3-ethylenedioxy-13β - propyl-17α-(2'-methyl)-allyl-Δ$^{4,9,11}$-gonatriene-17β-ol.

14. A compound of claim 10 which is 3-ethylenedioxy-13β-ethyl-17α-allyl-Δ$^{4,9,11}$-gonatriene-17β-ol.

References Cited

UNITED STATES PATENTS 3,257,278   6/1966   Nomine et al. _____ 167—74

HENRY A. FRENCH, Primary Examiner

U.S. Cl. X.R.

260—397.45; 424—243